United States Patent [19]

Evans

[11] Patent Number: 5,213,292
[45] Date of Patent: May 25, 1993

[54] TENSION ADJUSTING MECHANISM FOR TOOL BALANCER

[75] Inventor: Maurice Evans, Kalamazoo, Mich.

[73] Assignee: Woodhead Industries, Inc., Northbrook, Ill.

[21] Appl. No.: 872,086

[22] Filed: Apr. 22, 1992

[51] Int. Cl.⁵ .......................................... F16M 11/00
[52] U.S. Cl. ............................ 248/123.1; 248/280.1; 248/281.1
[58] Field of Search ............... 248/123.1, 124, 131, 248/132, 162, 416, 418, 280.1, 281.1, 585

[56] References Cited

U.S. PATENT DOCUMENTS

| | | |
|---|---|---|
| 730,580 | 6/1903 | Stanford . |
| 911,935 | 2/1909 | Baumwart . |
| 1,948,991 | 2/1933 | Molly . |
| 2,569,354 | 11/1946 | Tracy . |
| 3,973,748 | 8/1976 | Nagasaka . |
| 4,003,536 | 1/1977 | Sekerich ............................ 248/585 |
| 4,213,591 | 7/1980 | Haakkola ........................ 248/281.1 |
| 4,277,044 | 7/1981 | Hamilton . |
| 4,598,601 | 7/1986 | Molaug . |
| 4,852,842 | 8/1989 | O'Neill ........................ 248/123.1 X |
| 4,953,715 | 9/1990 | Celli . |
| 4,953,822 | 9/1990 | Sharber et al. ............... 248/280.1 X |
| 4,969,625 | 11/1990 | Singer et al. . |

Primary Examiner—Ramon O. Ramirez
Attorney, Agent, or Firm—Emrich & Dithmar

[57] ABSTRACT

A tool balancer for manufacturing/assembly work has a swing arm mounted to an upright standard or column. A bracket mounts an articulating arm to the distal end of the swing arm. A tool holder is mounted to the distal end of the articulating arm. An adjusting saddle received on the articulating arm has a tooth which couples to one of a series of adjusting apertures on the articulating arm. Tension springs are connected between the bracket and the adjusting saddle to bias the articulating arm upward to offset the weight of a tool and to maintain the adjusting saddle in locking engagement with the articulating arm at the desired adjustment.

6 Claims, 1 Drawing Sheet

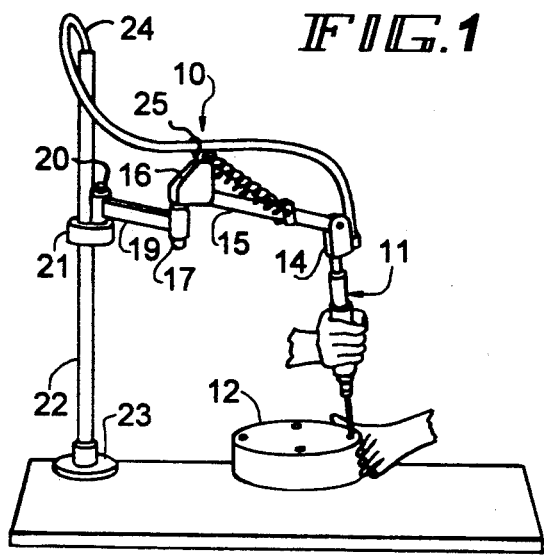
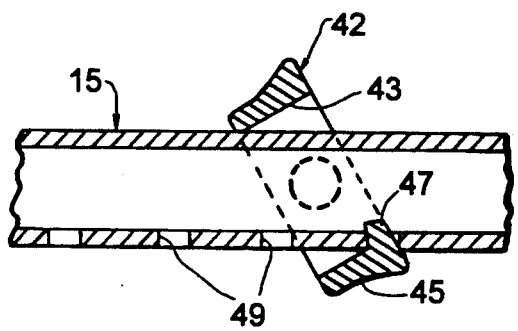
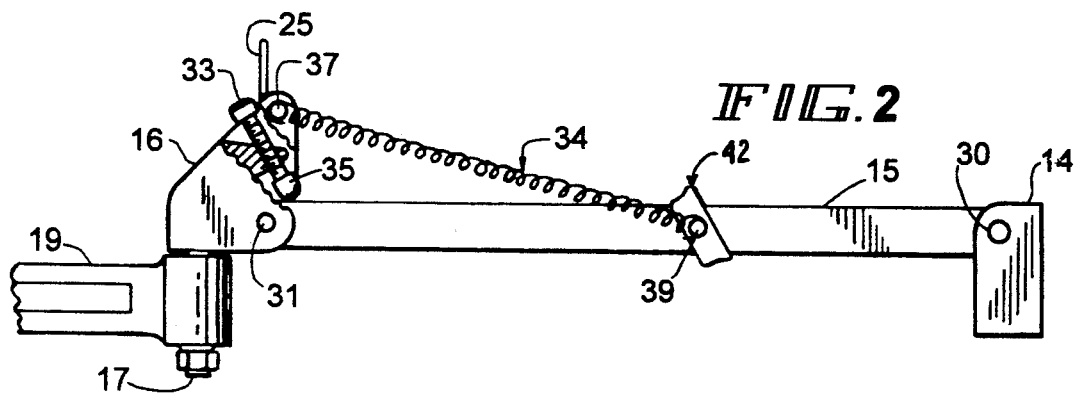
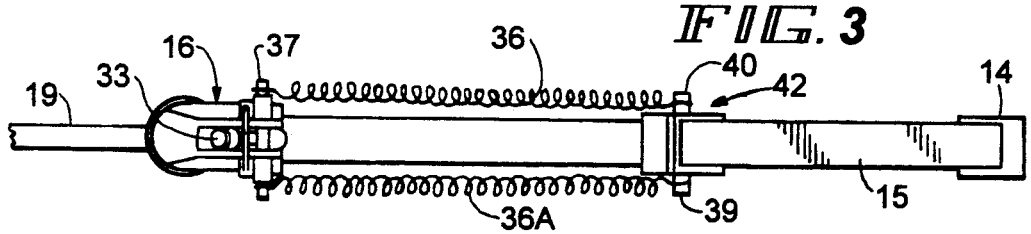
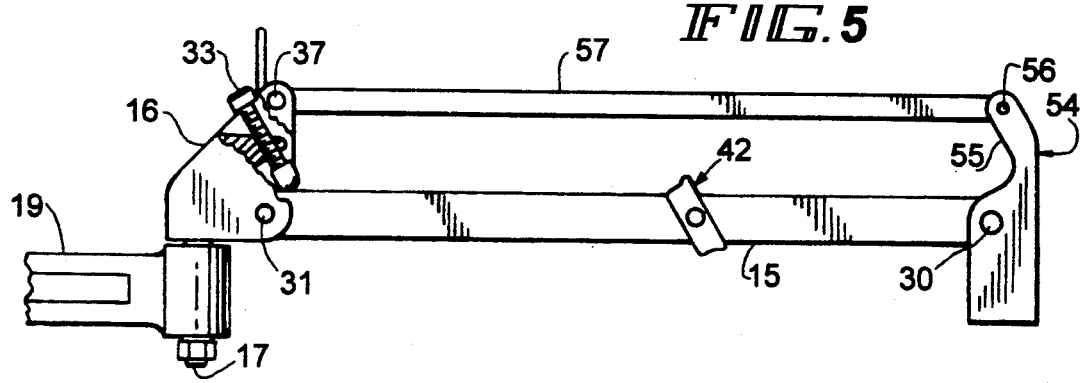

TENSION ADJUSTING MECHANISM FOR TOOL BALANCER

FIELD OF THE INVENTION

The present invention relates, in general, to tool balancers; and, more particularly, it relates to an improved apparatus for adjusting the tension on a spring which counterbalances the weight of a tool supported by an articulating arm on the tool balancer. A tool balancer is a device which partially or fully offsets the weight of a hand tool used by an assembly worker performing light duty assembly tasks, such as turning screws into work pieces, tightening nuts or bolts, and the like.

BACKGROUND OF THE INVENTION

Tool balancers are in widespread use in manufacturing, and they have particular acceptance where the tool being used transmits torque to the hand of the assembly worker. If torque is transmitted from the tool to the hand, wrist and arm of the worker, it has been found to produce muscle stress, which, in turn, contributes to the risk of repetitive motion injury (RMI) to the worker. Thus, some tool balancers have been designed to reduce the transmission of torque from the tool to the hand and arm of the worker.

In addition, where the assembly may continue over a number of hours, the worker's holding of the tool may induce additional muscle stress due to the weight of the tool. Therefore, there has been an attempt to design tool holders to balance the weight of the tool in addition to resisting or neutralizing torque produced by use of the tool. In order to accommodate the tool balancers to tools of different weights, it is deemed desirable to have the counter-balancing mechanism be adjustable. There are a number of techniques available for adjusting the counter-balancing force on the arm of a tool holder, but they have either required the use of a tool to produce the adjustment, or they have required the use of an adjusting screw to secure a bracket to an upright or standard on which the tool support arm is mounted, such as is shown in U.S. Pat. No. 4,969,626. The prior methods of providing an adjustment are either inconvenient or time consuming, in the case where they require a tool to effect the adjustment, or they are not readily accommodated to a tool balancer having an articulated support arm.

SUMMARY OF THE INVENTION

The present invention includes a conventional column or standard for supporting the tool support arm on a base, such as a bench or work station, at a vertically adjusted position. A jib or swing arm is mounted to the vertical standard by a conventional clamp and a vertical pivot shaft which permits the swing arm to rotate in about a vertical axis parallel to the standard. A bracket is pivotally mounted to the distal end of the swing arm, also for pivotal motion about a vertical axis, at the outboard end of the swing arm. The articulating arm is mounted to the bracket for pivotal motion in a vertical plane—i.e., about a horizon pivot pin carried by the bracket. The tool holder is mounted to the distal end of the articulating arm, and the tool holder may be of conventional design. That is, the tool holder may be adapted for universal motion or it may be designed to resist the transmission of torque from the tool being used.

A series of adjusting apertures are spaced axially along the bottom wall of the articulating arm; and a retainer or adjusting saddle is received on the articulating arm. The aperture in the adjusting saddle which receives the articulating arm is slightly larger than, but conforms to the configuration of the periphery of the articulating arm. A pair of tension springs are mounted between the adjusting saddle and the bracket connecting the articulating arm to the swing arm. The lower section of the saddle contains an inwardly-extending projection or tooth which is adapted to be received in one of the adjusting apertures in the articulating arm so that if the saddle is placed in an upright position, and it is lowered slightly, the tooth disengages the associated adjusting aperture and the adjusting saddle may be moved axially along the articulating arm for coupling to another adjusting aperture, thereby increasing or decreasing the tension of the springs.

The adjusting springs are inclined slightly upwardly from the adjusting saddle to the bracket, and they perform two functions. First, the tension springs bias the articulating arm in an upward direction to at least partially offset the weight of any tool mounted to the tool holder. Secondly, the tension springs force the locking tooth into an associated adjusting aperture in the bottom wall of the articulating link at a desired position so that the adjusting saddle cannot be readily dislodged once it is adjusted under normal operating conditions.

Adjustment of the counterbalancing force on the tool is simply and quickly effected without the use of tools simply by tilting the saddle to an upright position, disengaging the locking tooth, then moving the saddle to the desired position and permitting the locking tooth to couple with the selected locking aperture in the bottom of the articulated arm. Thereafter, the spring creates a slight upward force on the tilted saddle to insure that it remains coupled to the articulating arm at the desired position under normal use conditions, while providing a constant counter-balancing force to the tool for that particular adjustment.

Other features and advantages of the present invention will be apparent to persons skilled in the art from the following detailed description of a preferred embodiment accompanied by the attached drawing wherein identical reference numerals will refer to like parts in the various views.

BRIEF DESCRIPTION OF THE DRAWINGS

FIG. 1 is a perspective view of a tool balancer incorporating the improved adjustable counter-balancing mechanism;

FIG. 2 is a fragmentary side view of the apparatus of FIG. 1 showing a portion of the swing arm, the articulating arm and the adjusting mechanism;

FIG. 3 is fragmentary top view of the structure shown in FIG. 2;

FIG. 4 is a close-up longitudinal vertical cross-sectional view of a portion of the articulating arm and the adjusting saddle coupled to it; and FIG. 5 is a view similar to FIG. 2 of a tool balancer including the adjusting mechanism, but having a parallel linkage arrangement for the articulating arm to maintain the tool holder in a vertical position.

DETAILED DESCRIPTION OF A PREFERRED EMBODIMENT

Referring first to FIG. 1, reference numeral 10 generally designates a tool balancer. The tool balancer 10 is intended to support and at least partially counter-balance the weight of a tool 11 as an operator uses the tool on a work piece 12. The tool 11 is mounted to a tool holder 14 which, in turn, is supported on the distal end of an articulating arm 15. The inboard or proximal end of the articulating arm 15 is mounted to a bracket 16. The bracket 16, in turn, is mounted to a vertical pivot shaft 17 which is mounted in the distal end of a swing arm 19. The inboard end of swing arm 19 is mounted a vertical pivot shaft 20 which is mounted to a clamp 21.

The clamp 21 is mounted to a column or standard 22, the bottom of which is received in and supported by a base 23. The base 23 may be secured to a work surface or bench top in any conventional manner. The standard 22 may be tubular to permit a pneumatic hose 24 to be routed through the standard 22 and a hose guide 25 in the form of a loop to the tool holder 14 for powering the tool 11. The tool designated 11 may be any one of a number of hand-operated tools. The tool 11 in the illustrated embodiment is shown held in the hand of an operator, the other hand being free to grasp the work piece 12. In the illustrated embodiment, the tool 11 is a pneumatically-powered screwdriver, so there would normally be some torque transmitted from the tool to the operator's hand and arm during use.

The clamp 21 may be a conventional two-piece clamp, the pieces being secured together by bolts, so that the swing arm 19 and its associated pivot 20 may be adjusted vertically along the standard 22. Similarly, the swing arm 19 and pivot shafts 17 and 20 may be conventional so that they need not be further discussed in order to fully appreciate the present improvement.

Turning now to FIGS. 2 and 3, the tool holder 14 is conventional, and may be any one of a number of known tool holders, such as are adapted to accommodate pneumatic or electrical hand tools, including pistol-type grips where the tool is in the form of a pistol. The tool holder 14 is pivotally mounted to the distal end of the articulating arm 15 by means of a pivot pin 30. Thus, the tool and tool holder may be pivoted vertically in the plane of the page of FIG. 2.

The proximal end of the articulating arm 15 is pivotally mounted to the bracket 16 by means of a horizontal pivot shaft 31, thereby permitting the articulating arm to be rotated about the shaft 31 in a vertical plane represented by the plane of the page of FIG. 2. A set screw 33 is threaded into a central portion 34 of the bracket 16 which is internally threaded to receive the screw 33. The screw 33 is inclined to extend downwardly and toward the upper surface of the articulating arm 15; and the lower end of the set screw 33 is provided with a bumper 35 for engaging the upper surface of the arm 15 at a location slightly outboard of a vertical plane running through the axis of the pivot shaft 31 for the articulating arm 15. Thus, the bumper 35 acts as a limit or stop for counterclockwise rotation of the articulating arm 15, and thus the raising of the tool holder 14, by virtue of the setting of the set screw 33.

The articulating arm 15 is biased in a counterclockwise (i.e., tool-raising) direction about the pivot shaft 31 by means of an adjustable spring assembly generally designated 34. The spring assembly 34 includes first and second tension springs, diagrammatically represented at 36, 36A in FIG. 3 and located respectively on either side of the articulating arm when viewed from above. The springs 36, 36A extend downwardly and outwardly from a spring retention pin 37 mounted to the top of the bracket 16 and extending parallel to the pivot shaft 31.

The lower, outboard ends of the springs 36, 36A are similarly attached to spring retainers 39, 40 extending laterally of an adjusting saddle generally designated 42. In the illustrated embodiment, the outer cross-sectional shape of the articulating arm 15 is square; and the corresponding receiving aperture of the saddle 42 which is designated 43 in FIG. 4, is rectangular, being slightly higher than it is wide. This permits the operator to tilt the saddle between an upright position (that is, wherein the saddle extends in a plane transverse of the axis of the articulating arm 15), and a tilted or locking position as seen in FIG. 2.

Turning now to FIG. 2, the lower leg or portion 45 of the saddle 42 contains an upwardly and outwardly extending tooth 47 so that when the saddle is tilted counterclockwise to the locking position shown in FIG. 4, the tooth 47 will be generally upright and be received into a corresponding aperture of the series of apertures 49 formed in the bottom wall of the articulating arm 15, the arm 15 being formed of tubular metal. Thus, when the operator wants to increase the tension in the springs 36, 36A to create a larger counter-balancing force on a tool held in the holder 14, the operator grasps the top and bottom of the saddle 42, rotates the saddle slightly clockwise as viewed in FIG. 2, to an upright position, and moves the saddle down slightly to disengage the locking tooth 47. The saddle may then be slid axially of the articulating arm 15 (to an outer aperture 49 in the case where it is desired to increase the counter-balancing force), and the locking tooth is then inserted in the selected aperture by aligning the tooth with the aperture and lifting the saddle slightly.

The tension springs 35, 36 then perform two functions. First, they exert an upward or counter-balancing force on the articulating arm tending to bias it in a counterclockwise direction to ofset the weight of any tool in the holder 14. Secondly, the springs maintain the saddle 42 in the selected, locked position as seen in FIG. 4.

In the embodiment of FIGS. 1-3, the articulating arm is in the form of a single arm 15. The invention may equally well be adapted to a parallel arm arrangement of the type shown in FIG. 5. Parallel arm arrangements are used to maintain the tool held by the tool holder in a fixed (usually upright or vertical) position. As seen in FIG. 5, elements or structure which are similar to those already disclosed in connection with the first embodiment bear like reference numerals and need not be further described.

Turning then to FIG. 5, the tool holder is designated 54, and in addition to being pivotally mounted at 30 to the distal end of the lower articulating arm 15, the tool holder includes an upper extension 55 which is pivotally mounted at 56 to the outboard end of an upper link 57 which extends parallel to the lower articulating arm 15. The inboard end of the upper link 57 is pivotally mounted on the retainer shaft 37 which holds the upper ends of the springs 36, 36A. The operation of the parallel linkage arrangement shown in FIG. 7 will be apparent to persons skilled in the art, but briefly, as the tool is raised and lowered by the operator, the arrangement of link 57 and articulating arm 15 is such that the pivots 30, 56 will always remain in a generally vertical orientation since the pivots 30, 56, 37 and 31 form a parallelogram.

It will thus be appreciated that the present invention permits an operator quickly and conveniently to adjust the counter-balancing force on the articulating arm in an articulated tool balancer device, and to do so without tools.

Having thus disclosed in detail a preferred embodiment of the invention, persons skilled in the art will be able to modify certain of the structure which has been described and to substitute equivalent elements for those disclosed while continuing to practice the principle of the invention; and it is, therefore, intended that all such modifications and substitutions be covered as they are embraced within the spirit and scope of the appended claims.

I claim:

1. An improved apparatus for supporting a tool during working, comprising support means, a swing arm having a proximal end and a distal end, said proximal end being pivotally mounted to said support means for swinging motion in a generally horizontal plane; a vertical pivot shaft mounted to the distal end of said swing arm; a bracket mounted to said pivot shaft for pivotal movement about said shaft; an articulating arm having a central portion of generally uniform cross-section and having a proximal end and a distal end, said proximal end being mounted to said bracket for pivotal motion about a first horizontal pivot axis; a tool holder mounted to the distal end of said articulating arm; an adjusting saddle having an opening receiving said articulating arm; said saddle being constructed and arranged to be tilted by hand between an adjusting position in which said saddle may be moved axially of said articulating arm along said central portion, and a locking position in which said saddle engages and couples to said articulating arm at a position of desired adjustment; and spring means connected at one end to said bracket at a position above said horizontal pivot axis, and connected at a second end to said saddle to bias said saddle in the locking position and to bias said articulating arm upwardly at least partially to offset the weight of the tool mounted to said tool holder.

2. The apparatus of claim 1 wherein said spring means comprises first and second tension springs, one end of each of said tension springs being mounted to said bracket at a location above the pivotal connection between said bracket and said articulating arm, and the other ends of said spring being mounted to said saddle at the vertical mid-point thereof to cause said saddle to be biased upwardly in said locking position and thereby to exert an upward force on said articulating arm.

3. The apparatus of claim 1 wherein said saddle is in the form of a frame defining an opening conforming to and receiving said articulating arm, said opening of said saddle being slightly larger in the vertical direction than the height of said articulating arm so that said saddle, when moved to an upright position, may be adjusted along said articulating arm.

4. The apparatus of claim 3 wherein said saddle is generally rectangular and including upper and lower portions and first and second side portions connected together to form said frame, said saddle further defining a locking tooth extending upwardly and inwardly of said lower portion of said frame, said articulating arm being in the form of a tube, the lower surface of said tube defining a series of axially spaced apertures, said apertures being adapted to receive said locking tooth of said saddle to form a mechanical couple.

5. The apparatus of claim 1 further comprising an adjustable screw threadably received in said bracket and positioned to engage the upper portion of said articulating arm at a location outboard of the pivotal connection between said articulating arm and said bracket, thereby to adjustably set the raised limit of said tool holder.

6. The apparatus of claim 1 further comprising an upper linkage parallel to said articulating arm and having an inboard end pivotally connected to said bracket at a location above said first horizontal pivot axis, said upper linkage further being pivotally connected to said tool holder at a location above the pivotal connection between the distal end of said articulating arm and said tool holder.

* * * * *